United States Patent
Halus

[11] Patent Number: 6,000,880
[45] Date of Patent: Dec. 14, 1999

[54] SEWAGE WATER PURIFICATION/REUSE/ REDISTRIBUTION, FLOOD CONTROL, AND POWER GENERATING SYSTEM

[76] Inventor: William J. Halus, 5075 E. Crescent Dr., Anaheim Hills, Calif. 92807

[21] Appl. No.: 08/997,412

[22] Filed: Dec. 23, 1997

[51] Int. Cl.$^6$ .............................. E02B 11/00; E02B 13/00
[52] U.S. Cl. .............................................. 405/52; 405/36
[58] Field of Search .................................. 405/36, 52, 80, 405/87, 37–39, 75–79; 210/170

[56] References Cited

U.S. PATENT DOCUMENTS

| | | | |
|---|---|---|---|
| 447,887 | 3/1891 | Martin | 405/75 |
| 962,355 | 6/1910 | Johnson | 405/75 |
| 1,600,163 | 9/1926 | Burns | 405/75 |
| 2,246,472 | 6/1941 | Sharp | 405/75 X |
| 2,764,871 | 10/1956 | Dowling | 405/75 |
| 3,431,735 | 3/1969 | Stauber | 405/75 |
| 4,298,471 | 11/1981 | Dunkers | 405/52 X |
| 4,669,914 | 6/1987 | Kortmann | 405/52 |
| 5,160,214 | 11/1992 | Sakurai et al. | 405/52 X |
| 5,160,216 | 11/1992 | Takada et al. | 405/37 X |
| 5,228,802 | 7/1993 | Kuwabara et al. | 405/52 X |
| 5,282,694 | 2/1994 | Kovacs et al. | 405/36 |
| 5,672,028 | 9/1997 | Mehta | 405/36 |

*Primary Examiner*—Dennis L. Taylor
*Attorney, Agent, or Firm*—Donald W. Meeker

[57] ABSTRACT

Sloping water tunnels and channels interconnect existing sources of water with dry land areas to form new water basins. Turbines are installed in rapidly flowing portions of the water tunnels and channels to generate electricity. Overflow tunnels connected to the sloping water tunnels by water gates communicate with wastewater treatment plants feeding into the sloping water tunnels to open the water gates when the outflow of treated wastewater starts to back up. The water tunnels and channels are formed by removing earth and installing steel frames with sprayed on concrete which is waterproofed. The earth removed is used to fill valleys to create dams and dumped into existing lakes and ocean bays on pontoon railways to create breakwaters and islands. A number of existing sources of water and new water basins are interconnected by a number of open water channels navigable by water vessels to create a transregional navigable water transportation system. Sufficient water is transported to dry land areas creating new water basins so that the hydrological cycle is altered increasing precipitation and so that the dry land areas are supplied with water for irrigation, fire fighting, transportation, recreation, fishing, habitation uses, and other water needs.

18 Claims, 2 Drawing Sheets

SEWAGE WATER PURIFICATION/REUSE/ REDISTRIBUTION, FLOOD CONTROL, AND POWER GENERATING SYSTEM

BACKGROUND OF THE INVENTION

1. Technical Field

The present invention relates to water redistribution and power generating systems and in particular to a system of interconnected waterways for diverting water by gravity flow from overflowing lakes and rivers and from wastewater treatment plants through channels and underground tunnels to areas lacking in water while generating electricity with turbines positioned in the tunnels and channels deriving electric power from the moving water.

2. Description of the Prior Art

Some areas have an overabundance of water due to rainfall, melting snow, runoffs, high water tables, and various other reasons. Often flooding occurs at recurring intervals when the lake, river, or other water system is not large enough to handle overflow quantities of water. Water treatment plants produce an abundance of water which is normally dumped into rivers, lakes, and oceans where there is already an abundance of water. For example, the Los Angeles/Orange County sewage treatment plants discharge into the ocean daily 800,000,000 to 1,5000,000,000 gallons of partially treated water endangering Santa Monica Bay. The dumping of sewage water into the ocean creates the danger of polluting the ocean water endangering swimmers, surfers, and fish, and can at high tide contribute to flooding of ocean front homes.

Prior art flood control methods are often inadequate, especially sandbagging, when there are not enough sandbags to prevent flooding and when the rushing water breaks through the sandbag dikes. People who live in the flood prone areas must purchase separate costly ($400 or more per year) flood insurance. According to the national flood insurance program, damage from flooding (or earthquakes) is not covered by regular home owners policies. Some prior art methods provide overflow channels and ponds. But these prior art flood control means do not go far enough.

Another problem is in water distribution. While some areas are flooded out, others are dry and uninhabitable or very expensive due to the high cost of water. The cost of water piped into households and businesses can be excessive especially in dry areas ($800 per year or more in Southern California). Huge land areas, such as Death Valley and the Salton Sea in California, go to waste due to lack of water and tremendous pollution problems occur when old river and lakebeds dry up, as in Owens Lake in California, which has the worse air pollution in the United States with dry desert chemical-laden dust storms. Dry areas where there is some plant growth suffer extensive dammage on a fairly regular basis from fires, such as in Southern California.

A system is needed to redistribute water from flood areas and wastewater treatment plants to drought areas to create a balance in water supply and make previously dry lands habitable and available for agriculture and recreation, as well as creating a whole new network of electric power generating stations using water power.

DISCLOSURE OF THE INVENTION

The primary object of the present invention is to redistribute water resources from areas of abundance to areas of water shortage by creating a series of water channels and water tunnels to interconnect the areas using gravity flow to prevent flooding and increase the acreage of habitable land; including formation of interconnecting waterways for inland barge, boat and various other watercraft navigation with locks and means to raise and lower vessels to appropriate water levels for cross country navigation and water redistribution.

Another important object of the present invention is to transport water from wastewater treatment plants to areas of water shortage by creating a series of water channels and water tunnels to interconnect the treatment plants with the areas of water shortage by gravity flow. Marsh areas created between the water source and destination can purify the wastewater to make it fit for all desired uses.

A related object is to purify the treated wastewater further by exposure to sunlight and air in channels and newly created marshes, ponds, and lakes.

An additional significant object of the present invention is to create new sources of water generated electric power production by creating new water channels and water tunnels fitted with turbines for generating electricity.

A further object is to increase the number of water recreation sites by creating new lakes and ponds in areas which are currently dry.

An ancillary object is to create abundant sources of water for agricultural irrigation and fire fighting in areas which are currently lacking water, thereby increasing farming, forestry, and grazing acreage, and habitation safety and productivity.

Still another object is to create a new nationwide network of navigable interconnected waterways with a system of locks, docks, and lakes in which the level of water can be changed to raise or lower the boats for transporting goods and people using fast-moving water transportation capable of carrying large loads economically.

Yet another object is to create tunnels which will hold the moving water effectively and be self-supporting underground by boring a hole with large earthboring equipment, installing steel frames, spraying the frames with concrete, and waterproofing the concrete.

One more object of the present invention is to create breakwaters and islands for recreation, fish habitats, eventual erosion into sand for beaches and other uses offshore in the ocean and on lakes by transporting the earth material dug from the water tunnels and channels in gravel transporting cars by rail from the digging site and out over the water on pontoons with rails mounted thereon, thereby further assisting in the water redistribution by filling in a portion of the existing water source bottom, causing more of the water to flow out of the existing water source to the dry land area.

Yet another object of the present invention is to build water tunnels under mountain ranges having valleys with sources of water flowing in the valleys and to create dams in the mountain valleys using earth dug from the water tunnels to build the dams and to build power generating plants and thereby create mountain lakes and reservoirs for generating electric power, providing water recreation, and controlling floods.

In brief, the present invention provides a network of water channels and water tunnels interconnecting existing abundant water sources and wastewater treatment plants with areas where water is scarce creating water basins, thereby redistributing water resources more efficiently to prevent flooding and increase the acreage of habitable, arable, and recreational land, while at the same time tapping these water channels and tunnels as electric power generating sources to add to the energy grid and offset costs of building the water redistribution system. Also, the power created by the generating systems can be used to pump water as necessary to reach higher dry land where gravity flow is not possible.

In the process, the aerating of the moving treated wastewater and exposure to sunlight in open channels, marshes, and new ponds and lakes will further purify the water.

In creating a new network of navigable waterways, large fast-moving water transportation vehicles, such as hovercrafts, and other water vehicles including barges, power and sail boats, power water skis, and others can be used to transport goods and people over the waterways economically and quickly, thereby clearing congestion on highways, railways, and airways.

Some of the water channels and tunnels from rivers and lakes can be blocked by water gates during normal water level situations when it is desirable to let the normal amount of water flow in a river to its destination or maintain a desired normal water level in a lake, but released to flow into the new water channels and tunnels to divert the water to dry areas when the water level is above normal to prevent flooding and divert the excess water to an area where it is needed.

Over time the system will create new lakes and ponds in the areas to which the water is diverted for various water sports, fishing, fire fighting, and irrigation of dry land for forestry, agriculture and hydroponics. Eventually modification of the hydrologic cycle for weather will be possible such as converting high pressure areas into low pressure areas and creating more precipitation in dry areas, such in Death Valley and over areas of dry lakes in deserts.

One advantage of the present invention is that it can reclaim and transform, for habitation, farming, fishing, recreation, and many other uses, large desert areas such as the Death Valley, Salton Sea, and many other areas by forming large lakes by gravity flow from water sources, such as the Los Angeles/Orange County wastewater treatment plants to these low desert regions. Marshes inbetween can purify the wastewater. The reclaimed wasteland would be converted to habitable, arable, land and water recreation areas and wildlife refuges.

An additianal advantage is that all of the water gravity fed into the desert areas would alter the hydrologic cycle in Death Valley and the Salton Sea and other desert areas. The evaporating water would lower the temperatures and cumulous clouds full of water would drift with the wind and create afternoon thundershowers over previously dry desert areas on a daily basis. Low pressure areas would be able to form over the desert to produce periodic steady precipitation, such as the drizzly weather of the northwest. The deserts would bloom.

Another advantage is that, at the same time, the Santa Monica Bay and other current water bodies receiving wastewater can be cleaned up to pristine condition for safe swimming, fishing, recreation, and other uses. In addition, the earth dug up to create the water tunnels and channels can be dumped into the Santa Monica Bay or other water bodies for breakwaters, sealife habitats, islands, and eventually eroded sand for the beaches and also used to build dams in mountain valleys to create mountain lakes.

A third advantage is that electricity generated from the present invention can be used to pump water to higher dry areas, such as the Owens Lake in California, which was dried up when water was diverted to serve Los Angeles. The electricity can also be used to power other systems, such as the Computerized Electric Cable Powered/Guided Aircraft Transportation/Power/Communication System of U.S. Pat. No. 5,653,174 owned by the present inventor. The combined systems can transform and renew regions, such as the entire U.S., with abundant inexpensive water, no flooding, reduced wild fires, new bodies of water, new inexpensive sources of electric power, reclaimed land for habitation, wildlife, agriculture with abundant irrigation, and recreation areas, a new water transportation system and aerial transportation system supplementing other transportation systems with the increased employment and economic growth that would accompany the implementation of the systems.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
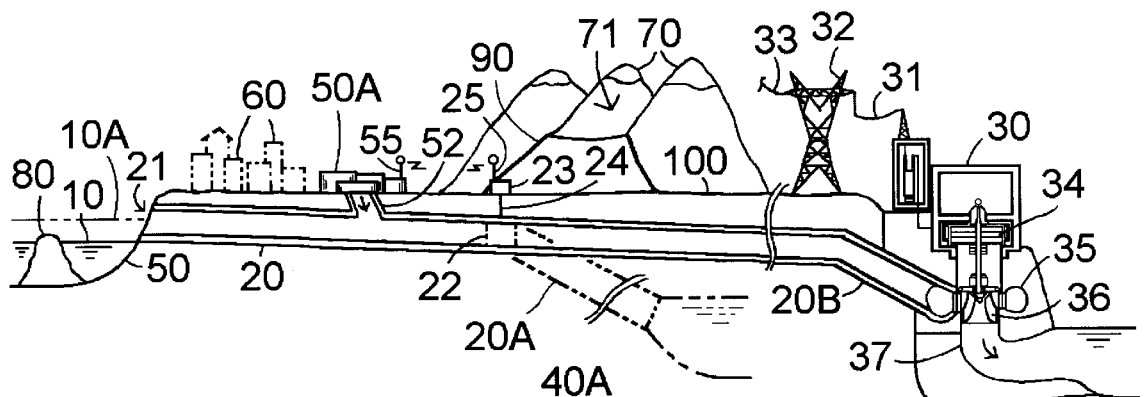
FIG. 1 is a vertical cross-sectional view taken through the centerline of the water tunnel.
Figure 2:
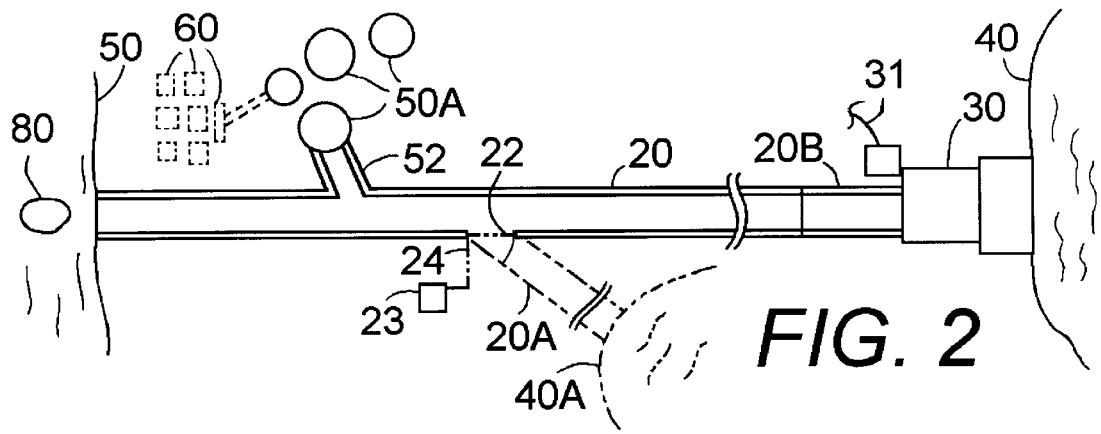
FIG. 2 is a horizontal cross-sectional view taken through the centerline of the water tunnel.

In FIGS. 1 and 2 a system of redistributing water is provided from an existing source of water, such as a lake, a river 50, and a wastewater treatment plant 50A to a dry land area to form a water basin 40 there by gravity flow through a sloping water tunnel 20 as in U.S. Pat. No. 3,431,735 and built under a purchased or leased right-of-way (such as those purchased or leased by utility companies or state and local governments) between the source of water and the dry land area, and generating electric power using a generator 34 activated by a turbine 36 in the flow of water, as in current hydro-electric power generation.

The system comprises a gravity flow means, such as the sloping water tunnel 20 for transporting water 10 connecting at least one existing source of water, such as river 50, to at least one dry land area of lower altitude than the at least one existing source of water so that the water flows by gravity feed between the at least one existing source of water to the at least one dry land area, the water transportation means sloping downwardly from the at least one existing source of water to the at least one dry land area, at least one rapid-flowing portion of the gravity flow means, such as the increased gradient portion 20B of the sloping water tunnel 20, for transporting water sloping sufficiently so that the water flow is sufficient to drive a means for generating electricity. such as the generator 34 activated by the turbine 36 turned by water flowing through the spiral case 35 at the bottom of the increased gradient portion 20B of the sloping water tunnel 20. The mouth 21 of the water tunnel may be positioned so that the normal level of the water 10 is below the mouth, but when the river 50 reaches a flood level 10A the overflow water will flow into the water tunnel to prevent flooding and provide water to the water basin 40 in the dry land area.

A water power means for generating electricity 30, such as the generator 34 activated by the turbine 36, is positioned in the at least one rapid-flowing portion, such as the increased gradient portion 20B of the gravity flow means (sloping water tunnel 20) for transporting water so that the water flow in the rapid-flowing portion is capable of generating electric power in the water power means for generating electricity, the generator 34 activated by the turbine 36 turned by water flowing through the spiral case 35 surrounding the turbine 36 at the bottom of the increased gradient portion 20B of the sloping water tunnel 20.

Figure 4:
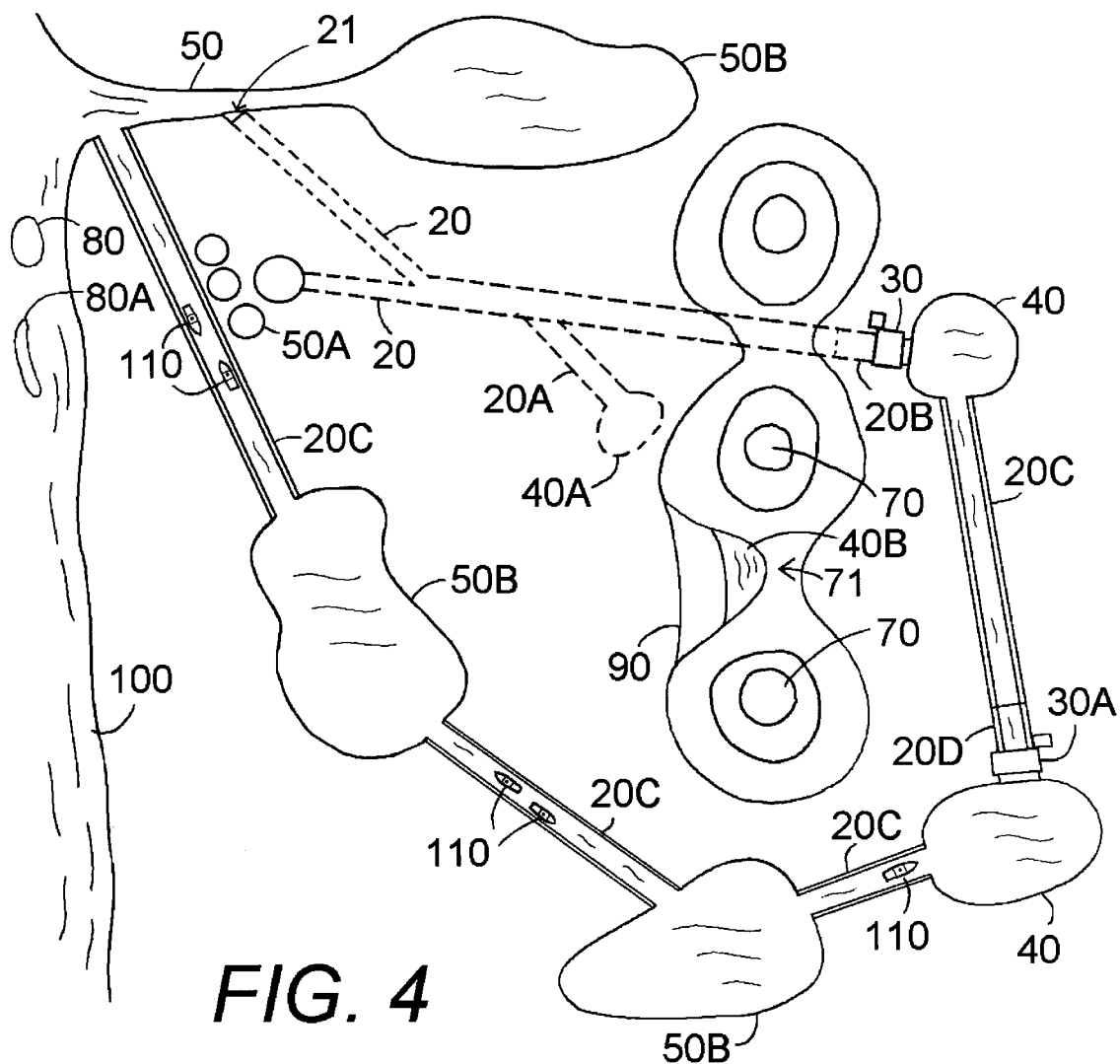
FIG. 4 is a plan view showing a large land area with various water tunnels and water channels interconnecting rivers, lakes, and newly created water basins.

In FIG. 4 a water power means for generating electricity 30A is a turbine and generator installed in an increased gradient portion 20D of an open water channel 20C, which interconnects two newly formed water basins 40.

Figure 3:
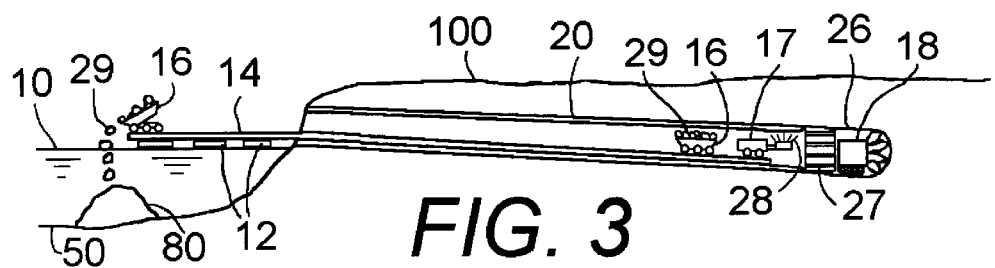
FIG. 3 is a vertical cross-sectional view taken through the centerline of the water tunnel showing the construction of the water tunnel.

In FIG. 3 the sloping water tunnel 20 is formed by boring the tunnel opening 26 with an earth boring machine 18 and installing steel structural frame members 27 positioned in the bored out portion of the earth forming the water tunnel opening 26, the steel structural members being spray coated with concrete 28 from a high powered concrete spraying gun 17 and waterproofed with a vapor barrier coating.

The earth material 29 is removed from the water tunnel opening on rail cars 16 and used as a fill material 80 to form a breakwater or island 80 in a body of water, such as the lake 50, the earth material 29 transported over a portion of the existing source of water on a rail system 14 mounted on pontoons 12. In FIG. 4 the earth material is used in the ocean 100 along the shore to form an island 80 and a breakwater 80A.

In FIG. 1 the water tunnel 20 is located beneath a mountain range 70 having valleys 71 and a source of water flowing down the valleys, as from melting snow, and the earth material is removed from the water tunnel opening on rail cars and used as a material to build a dam 90 in at least one of the valleys 71 to dam up the source of water to form a mountain lake or reservoir 40B, as seen in FIG. 4.

In FIGS. 1 and 2 the sloping water tunnel 20 has at least one overflow tunnel 20A communicating with the sloping water tunnel and having a water gate 22 similar to those used in canals having different water levels, therebetween, the water gate being capable of opening when the water tunnel is full to allow overflow water to flow into the overflow tunnel to prevent a backup to the existing source of water.

In FIGS. 1 and 2 the existing source of water is the outflow through a channel 52 from a wastewater treatment plant 50A communicating with the sloping water tunnel 20, an outflow of treated wastewater exiting the wastewater treatment plant into the sloping water tunnel. A radio transmitter in the wastewater treatment plant with a transmitting antenna 55 means for communicating between the wastewater treatment plant and the receiving antenna 25 on the water gate control 23 to activate the water gate 22 to open via control line 24 when the outflow of treated wastewater backs up. The overflow water is diverted to form a water basin 40A in another dry area. In FIG. 4 the overflow water in the overflow tunnel 20A fills an underground aquifer 40A.

In FIG. 4 a plurality of sources of water, such as rivers 50, lakes 50B, and wastewater treatment plants 50A and a plurality of dry land areas where new water basins 40, including marshes (for water purification), ponds and lakes are formed are interconnected by a plurality of gravity flow means, such as water tunnels 20 and water channels 20C for transporting water (and purifying water in the open channels by aeration) so that water may be transported among the plurality of sources of water and the plurality of dry land areas for flood control and better distribution of water resources. Sufficient water is transported to dry land areas creating new water basins so that the hydrological cycle is altered increasing precipitation and so that the dry land areas are supplied with water for irrigation, fire fighting, transportation, recreation, fishing, habitation uses, and other water needs.

A number of the gravity flow means for transporting water comprise sloping open water channels 20C which are capable of being navigated by water vessels 110 so that high speed efficient water craft, such as hovercraft, and other water vehicles including barges, power and sail boats, power water skis, and others may be used to transport goods and passengers quickly and economically. Sufficient sloping open water channels may be built to interconnect a number of existing and new water sources over an entire region thereby creating a transregional navigable water transportation system, including an interstate and transcontinental navigable water transportation system.

In FIGS. 1 and 2 the method of redistributing water from an existing source of water, such as a lake, a river 50, and a wastewater treatment plant to a dry land area by gravity flow and generating electric power from the flow comprises building a gravity flow means, such as a water tunnel 20, for transporting water from at least one existing source of water to at least one dry land area of lower altitude than the at least one existing source of water so that the water flows by gravity feed between the at least one existing source of water to the at least one dry land area, the water transportation means sloping downwardly from the at least one existing source of water to the at least one dry land area, at least one rapid-flowing portion 20B of the gravity flow means for transporting water sloping sufficiently so that the water flow is sufficient to drive a means for generating electricity; and installing a water power means for generating electricity, such as a generator 34 with a turbine 36, in the at least one rapid-flowing portion of the gravity flow means for transporting water so that the water flow in the rapid-flowing portion is capable of generating electric power in the water power means for generating electricity.

In FIG. 3 the method further comprises the step of fabricating the sloping water tunnel by boring out a portion of earth material to form the water tunnel opening 26 with an earth boring machine 18, forming the water tunnel of steel structural frame members 27 positioned in the bored out portion of the earth forming the water tunnel opening, spray coating the steel structural members with concrete 28 and waterproofing the concrete.

The method further comprises the step of removing a portion of earth material 29 from the water tunnel opening on rail cars 16 and using the portion of earth material as a fill material 80 in the existing source of water by building a rail system 14 mounted on pontoons 12 over a portion of the existing source of water and transporting the portion of earth material over the portion of the existing source of water on the rail system mounted on pontoons and dumping the portion of earth material into the existing source of water.

In FIG. 1 the water tunnel is located beneath a mountain range 70 having valleys 71 and a source of water flowing down the valleys, and the method further comprises the step of removing the portion of earth material from the water tunnel opening on rail cars and using the portion of earth material to build a dam 90 in at least one of the valleys 71 to dam up the source of water.

In FIGS. 1 and 2 the method further comprises the step of building at least one overflow tunnel 20A communicating with the sloping water tunnel and installing a water gate 22 therebetween, the water gate being capable of opening when the water tunnel is full to allow overflow water to flow into the overflow tunnel to prevent a backup to the existing source of water.

In FIGS. 1 and 2 the existing source of water is a wastewater treatment plant 50A communicating with the sloping water tunnel and an outflow of treated wastewater exits the wastewater treatment plant into the sloping water tunnel and further comprising the step of installing a means for communicating between the wastewater treatment plant and the water gate to activate the water gate to open when the outflow of treated wastewater backs up.

In FIG. 4 the further comprises the step of constructing a plurality of gravity flow means 20, 20A, and 20C for transporting water interconnecting a plurality of sources of water 50, 50A, and 50B and a plurality of dry land areas where water basins 40 are formed so that water may be transported among the plurality of sources of water and the plurality of dry land areas. Sufficient water is transported to dry land areas creating new water basins so that the hydrological cycle is altered increasing precipitation and so that the dry land areas are supplied with water for irrigation, fire fighting, transportation, recreation, fishing, habitation uses, and other water needs.

The method further comprises the step of constructing a number of the gravity flow means for transporting water as sloping open water channels 20C capable of being navigated by water vessels 110. Sufficient sloping open water channels may be built to interconnect a number of existing and new water sources over an entire region thereby creating a transregional navigable water transportation system, including an interstate and transcontinental navigable water transportation system.

It is understood that the preceding description is given merely by way of illustration and not in limitation of the invention and that various modifications may be made thereto without departing from the spirit of the invention as claimed.

What is claimed is:

1. A system of distributing a flow of water from a wastewater treatment plant to a dry land area of lower altitude than the wastewater treatment plant, thereby forming a water basin in the dry land area, the system comprising:
    at least one gravity flow means downwardly sloping away from the wastewater treatment plant to the water basin and communicating therebetween to enable the flow of water from the wastewater treatment plant to flow via the at least one gravity flow means to the water basin by gravity flow thereby distributing the water to the water basin;
    a means for preventing the flow of water from the wastewater treatment plant from backing up into the wastewater treatment plant; and
    wherein the means for preventing the flow of water from the wastewater treatment plant from backing up into the wastewater treatment plant comprises at least one overflow gravity flow means to another water basin downwardly sloping away from and in communication with the at least one gravity flow means, and further comprising a water gate therebetween, the water gate being capable of opening when the at least one gravity flow means is full to allow overflow water to flow into the at least one overflow gravity flow means to prevent a backup to the wastewater treatment plant.

2. The system of claim 1 further comprising a water gate control to activate the water gate, the water gate control having a receiving antenna and further comprising a radio transmitter adjacent to the at least one gravity flow means, the radio transmitter having a transmitting antenna for communicating with the water gate control via the receiving antenna to activate the water gate to open when the flow of water in the at least one gravity flow means reaches a critical level.

3. The system of claim 2 wherein the at least one gravity flow means comprises at least one rapid-flowing portion sloping sufficiently so that the water flow is sufficient to drive a means for generating electricity and further comprising a water power means for generating electricity positioned in the at least one rapid-flowing portion so that the water flow in the rapid-flowing portion is capable of generating electric power in the water power means for generating electricity.

4. The system of claim 3 wherein the at least one gravity flow means for transporting water comprises at least one sloping water tunnel and the water power means for generating electricity comprises a turbine for an electric generator positioned in the at least one rapid-flowing portion.

5. The system of claim 4 wherein the at least one sloping water tunnel is formed of steel structural frame members positioned in a bored out portion of the earth forming a water tunnel opening, the steel structural members being spray coated with concrete and waterproofed.

6. The system of claim 5 wherein earth material is removed from the at least one water tunnel opening on rail cars and used as a fill material in a body of water, and further including a rail system mounted on pontoons over a portion of the body of water, the earth material transportable over the portion of the body of water on the rail system mounted on the pontoons.

7. The system of claim 5 wherein the at least one water tunnel is formed beneath a mountain range having valleys and a source of water flowing down the valleys, and further comprising a dam built from the earth material removed from the water tunnel opening in at least one of the valleys to dam up the source of water.

8. The system of claim 1 further comprising a plurality of gravity flow means interconnecting a plurality of sources of water and a plurality of dry land areas at lower elevations than the sources of water for transporting water, and a plurality of intervening marshes wherein the water is allowed to remain for a time allowing for natural purification of the water, so that water may be transported among the plurality of sources of water and the plurality of dry land areas thereby creating a plurality of new water sources in the plurality of dry land areas so that the plurality of dry land areas are provided with purified water for irrigation, fire fighting, recreation, fishing, and habitation uses.

9. The system of claim 8 wherein a number of the gravity flow means for transporting water comprise sloping open water channels capable of being navigated by water vessels, the sloping open water channels interconnecting a number of existing and new water sources over an entire region thereby creating a transregional navigable water transportation system.

10. A method of distributing a flow of water from a wastewater treatment plant to a dry land area of lower altitude than the wastewater treatment plant, thereby forming a water basin in the dry land area, the method comprising:
    building at least one gravity flow means downwardly sloping away from the wastewater treatment plant to the water basin and communicating therebetween and enabling the flow of water from the wastewater treatment plant to flow via the at least one gravity flow means to the water basin by gravity flow thereby distributing the water to the water basin;

building a means for preventing the flow of water from the wastewater treatment plant from backing up into the wastewater treatment plant; and wherein the means for preventing the flow of water from the wastewater treatment plant from backing up into the wastewater treatment plant comprises at least one overflow gravity flow means to another water basin downwardly sloping away from and in communication with the at least one gravity flow means, and further comprising the step of building a water gate therebetween, and opening the water gate when the at least one gravity flow means is full to allow overflow water to flow into the at least one overflow gravity flow means to prevent a backup to the wastewater treatment plant.

11. The method of claim 10 further comprising the step of building a water gate control to activate the water gate, the water gate control having a receiving antenna and building a radio transmitter adjacent to the at least one gravity flow means, the radio transmitter having a transmitting antenna for communicating with the water gate control via the receiving antenna and activating the water gate to open when the flow of water in the at least one gravity flow means reaches a critical level.

12. The method of claim 10 further comprising the step of providing the at least one gravity flow means with at least one rapid-flowing portion sloping sufficiently so that the water flow is sufficient to drive a means for generating electricity and providing a water power means for generating electricity positioned in the at least one rapid-flowing portion so that the water flow in the rapid-flowing portion is capable of generating electric power in the water power means for generating electricity.

13. The method of claim 12 wherein the step of building the at least one gravity flow means for transporting water comprises building at least one sloping water tunnel with at least one rapid-flowing portion of the sloping water tunnel and the step of installing the water power means for generating electricity comprises positioning a turbine for an electric generator in the at least one rapid-flowing portion of the sloping water tunnel.

14. The method of claim 13 further comprising the step of fabricating the at least one sloping water tunnel by boring out a portion of earth material to form a water tunnel opening, forming the at least one water tunnel of steel structural frame members positioned in the bored out portion of the earth forming the water tunnel opening, spray coating the steel structural members with concrete and waterproofing the concrete.

15. The method of claim 14 further comprising the step of removing the portion of earth material from the at least one water tunnel opening on rail cars and using the portion of earth material as a fill material in an existing source of water by building a rail system mounted on pontoons over a portion of the existing source of water and transporting the portion of earth material over the portion of the existing source of water on the rail system mounted on pontoons and dumping the portion of earth material into the existing source of water.

16. The method of claim 14 further comprising the step of forming the at least one water tunnel beneath a mountain range having valleys and a source of water flowing down the valleys, and further comprising the step removing the portion of earth material from the water tunnel opening on rail cars and using the portion of earth material to build a dam in at least one of the valleys to dam up the source of water.

17. The method of claim 10 further comprising the step of constructing a plurality of gravity flow means for transporting water between a plurality of existing water sources and a plurality of dry land areas, at lower elevations than the sources of water, including forming intervening marshes wherein the water is allowed to remain for a time allowing for natural purification of the water, so that water may be transported among the plurality of sources of water and the plurality of dry land areas thereby creating a plurality of new water sources in the plurality of dry land areas so that the plurality of dry land areas are provided with purified water for irrigation, fire fighting, recreation, fishing, and habitation uses.

18. The method of claim 17 further comprising the step of constructing a number of the gravity flow means for transporting water in the form of sloping open water channels capable of being navigated by water vessels, the sloping open water channels interconnecting a number of existing and new water sources over an entire region thereby creating a transregional navigable water transportation system.

* * * * *